June 2, 1964  E. KOTTSIEPER  3,135,487
MOUNT SUPPORT WITH TORQUE INDICATOR
Filed Sept. 7, 1962  2 Sheets-Sheet 1
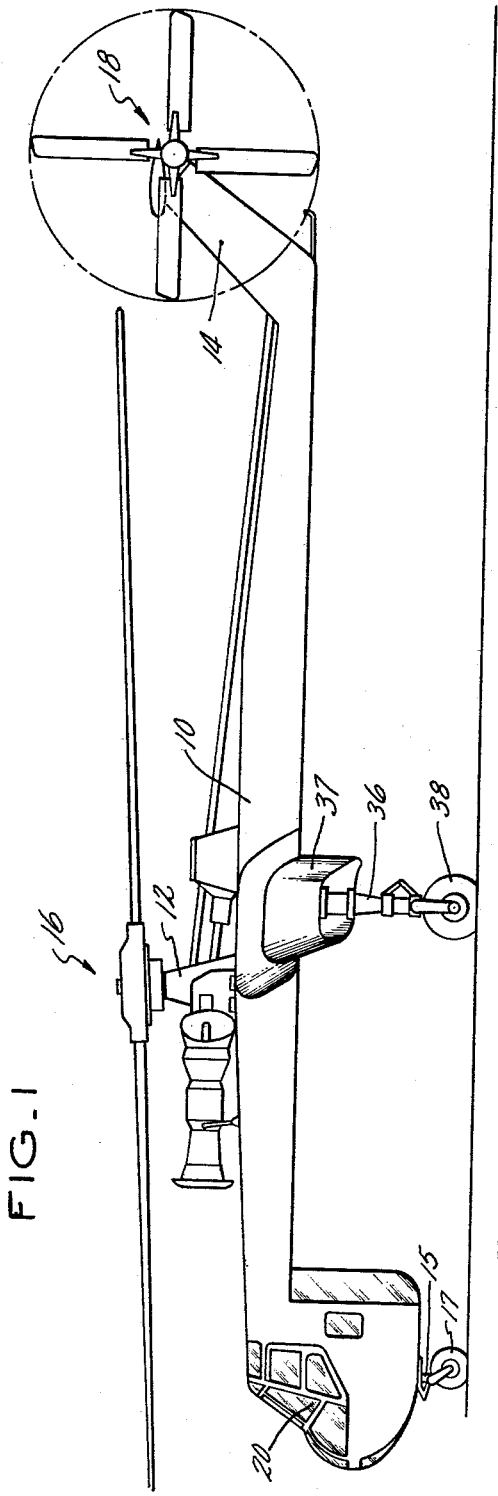
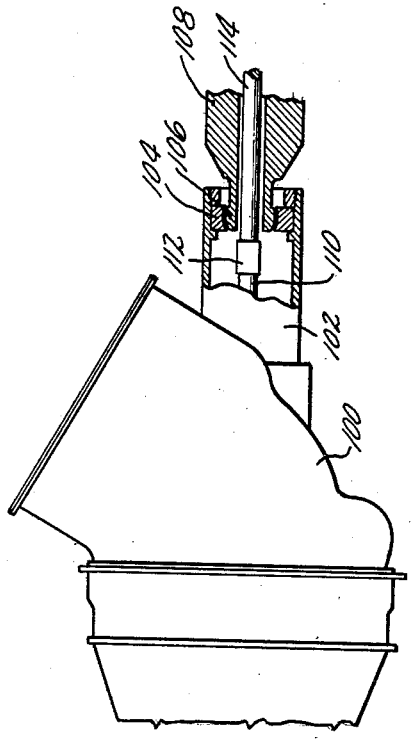
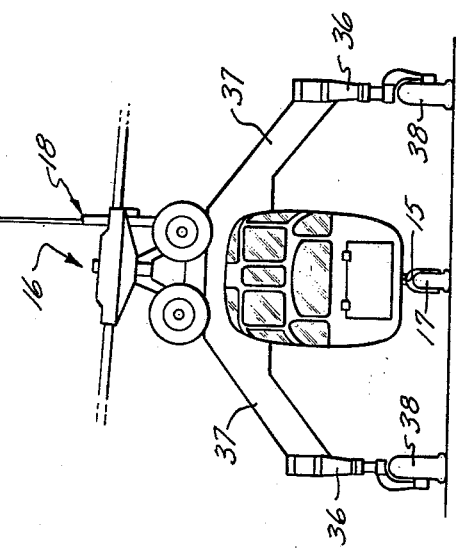
INVENTOR
EDWARD KOTTSIEPER
BY Jack N. McCarthy
AGENT

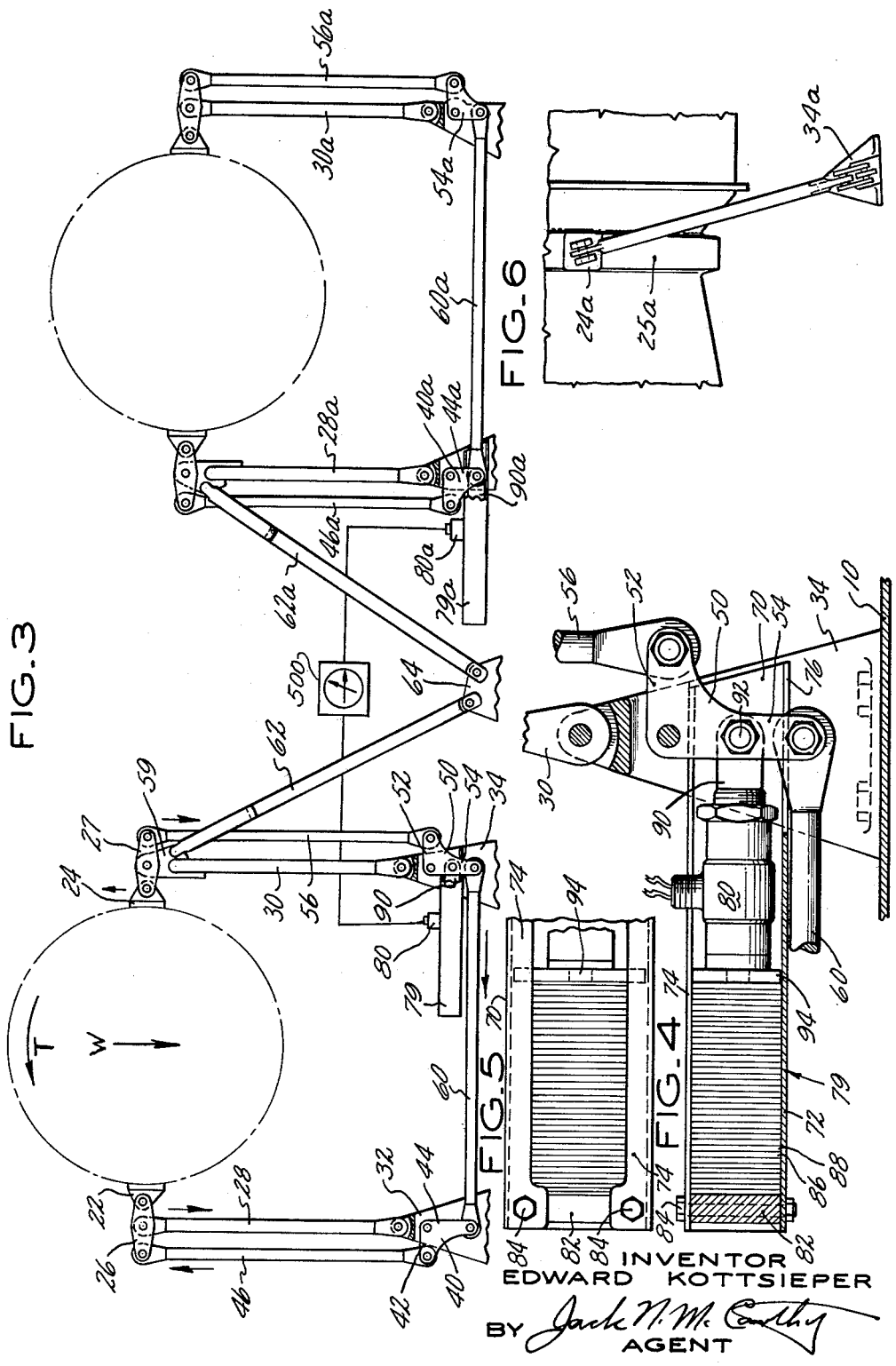

United States Patent Office 3,135,487
Patented June 2, 1964

3,135,487
MOUNT SUPPORT WITH TORQUE INDICATOR
Edward Kottsieper, Fairfield, Conn., assignor to United Aircraft Corporation, East Hartford, Conn., a corporation of Delaware
Filed Sept. 7, 1962, Ser. No. 221,999
14 Claims. (Cl. 248—5)

This invention relates to an engine support including means for indicating engine torque.

An object of this invention is to mount an aircraft-turbine engine at a plurality of planes along its length with only one mount restricting rotation of said engine casing.

Another object of this invention is to provide a mounting means which will permit thermal changes in the length of the engine while not affecting the operation of the engine support.

A further object of this invention is to provide a universal mounting means at the rearward end which will support said engine casing but permit rotation thereof.

Another object of this invention is to provide a linkage in the forward mount which will be responsive to rotation of said engine casing.

A further object of this invention is to provide a torque meter which will be actuated by movement of linkage included in the forward engine support.

Another object of this invention is to provide a load indicating device such as a load cell device between linkage of said forward mounting support and fuselage structure capable of sending an output to a torque indicator in the pilot's compartment.

These and other objects and advantages will be apparent from the specification and claims and from the accompanying drawings which illustrate an embodiment of the invention.

FIGURE 1 is a side elevation of a crane helicopter showing the location of the turbine engines over the fuselage;

FIGURE 2 is a front view of the crane helicopter;

FIGURE 3 is an enlarged front view of the forward engine support and torque reading means;

FIGURE 4 is an enlarged view of the load cell and damper means shown connected to an operating bell crank;

FIGURE 5 is a top view of the damper of FIGURE 4;

FIGURE 6 is an enlarged side view of the forward engine support as shown in FIGURE 1; and FIGURE 7 is an enlarged top view of the rear end of the right-hand engine showing the aft spherical mounting.

Referring to FIG. 1, the crane helicopter comprises essentially an elongated fuselage 10 having a main rotor 16 and transmission 12 mounted thereon; a tail rotor pylon 14 extends upwardly from the rear of the fuselage having a tail rotor 18 mounted thereon. The rotor 16 is conventional having a rotor head with rotor blades mounted thereon. A rotor shaft extends upwardly from the transmission 12 for driving said rotor head.

The main rotor is simply shown in view of the fact that it does not form part of this invention.

The fuselage 10 is constructed as a thin, elongated structure having an operator's compartment 20 extending downwardly at its forward end. Two turbine engines are mounted on the fuselage providing the powerplant section. Each turbine is drivingly connected to the transmission 12 and has its casing mounted to the fuselage.

The helicopter is supported on the ground by a tricycle landing gear including main oleo struts 36 and wheels 38 and a nose strut 15 and wheel 17. The oleo struts 36 are supported on each side of the helicopter by laterally extending arms 37.

In describing the forward engine supports, shown in FIG. 3, the support for the right-hand turbine engine will be described first in view of the similarities of the two engine mounts.

Those parts which differ on the left-hand engine mount will be later described. Engine mount brackets 22 and 24 are attached to a reinforced supporting ring 25 built into the engine. These brackets are located one on each side of the engine, diametrically opposed on a line passing horizontally through the center line of the engine. A lever 26 has one end pivotally mounted to a bracket 22 and extends horizontally outwardly from said bracket. A like lever 27 is pivotally attached to the bracket 24 and extends horizontally outwardly therefrom in the same manner.

A support link 28 is pivotally attached at its upper end to the center of lever 26 to permit relative movement between the two members and pivotally connected at its lower end to support bracket 32 which projects upwardly from the fuselage 10 of the helicopter. A similar support link 30, of equal length to link 28, is pivotally attached at its upper end to the center of lever 27 to permit relative movemenet between the two members and pivotally connected at its lower end to a support bracket 34, see FIG. 4. The horizontal distance between the pivotal attachment of support link 28 to lever 26 and the pivotal attachment of link 30 to lever 27, with levers 26 and 27 horizontal, as shown, is equal to the distance between the lower pivotal connection of link 28 to support bracket 32 and the pivotal connection of link 30 to bracket 34.

The top of support link 30 is formed having an attaching member 59. A support link 62 is pivotally connected at its upper end to member 59 and is pivotally connected at its lower end to a bracket 64 which extends upwardly from the fuselage of the helicopter 10. The upper end of the support link 62 is bifurcated for a purpose to be hereinafter described. Support link 62 is fixed in place so as to locate link 30 in a fore-and-aft vertical plane passing through its lower pivotal connection to bracket 34. This also locates link 28 in a fore-and-aft vertical plane passing through its lower pivotal connection to bracket 32. While these links each lie in a separate vertical fore-and-aft plane, they both lie in a lateral plane which may be vertical or which may be tilted slightly, see FIG. 6.

A bell-crank lever 40, having two arms extending at 90° to each other, is pivotally mounted to support bracket 32 at a point below and on a line with the axis of support link 28. One arm 42 of said bell crank 40 extends in a horizontal direction away from the center line of the helicopter. A second arm 44 of said bell-crank lever 40 extends in a downward direction on a line with the axis of link 28. The free outer end of lever 26 is pivotally connected to the upper end of a transmitting link 46. The bottom of said transmitting link 46 is pivotally attached to the free end of the arm 42 of the bell-crank lever 40. The axis of link 46 is parallel to the axis of link 28.

A bell-crank lever 50, having two arms extending at 90° to each other, is pivotally mounted to support bracket 34 at a point below and on a line with the axis of support link 30. One arm 52 of said bell crank 50 extends in a horizontal direction toward the center line of the helicopter. A second arm 54 of said bell-crank lever 50 extends in a downward direction on a line with the axis of link 30. The free outer end of lever 27 is pivotally connected to the upper end of a transmitting link 56. Link 56 passes through the upper end of support link 62 which is bifurcated as mentioned hereinbefore. The bottom of said transmitting link 56 is pivotally attached to the free end of the arm 52 of the bell-crank lever 50. The axis of link 56 is parallel to the axis of link 30.

A horizontal transmitting link 60 is pivotally attached at one end to the free end of arm 44 of bell-crank lever 40. The other end of the transmitting link 60 is pivotally attached to the free end of the arm 54 of bell-crank lever 50.

Each lever 26 and 27 is formed of two plates held together by the bolts passing through each of the three connecting points. While the connection between bracket 22 and lever 26 only allows pivotal movement, the other two connections include a ball joint. The same construction is true of bracket 27. Support bracket 32 extends upwardly from the helicopter fuselage and comprises two reinforced plate members integrally connected between the connection of the link 28 and the connection of the bell-crank lever 40. The bracket 34 is constructed in a similar manner.

Bell-crank lever 40 is connected between the plate members of bracket 32 by a connection which only allows pivotal movement. Bell crank 50 is connected in the same manner. The connection of support link 28 to support bracket 32 and of transmitting link 46 to arm 42 of bell crank 40, includes a ball joint. The connection of support link 30 to support bracket 34 and of transmitting link 56 to arm 52 of bell crank 50, includes a ball joint. The ball joint connections at the top and bottom of links 28 and 46, and 30 and 56, permit fore-and-aft movement of brackets 22 and 24 with respect to brackets 32 and 34.

The rear engine support for each engine is identical. In view of this, just the rear mounting of the right-hand engine will be described. The right-hand engine has a gas deflector 100 which diverts the gas flow away from the helicopter. This deflector has an extension 102 which extends rearwardly as a cylinder. A spherical seat 104 is fixedly mounted in the rear part of the cylindrical extension 102. A ball 106 is positioned within said spherical seat 104 and is fixedly attached to a member 108 which is attached to the fuselage through the transmission 12. It can be seen where this joint supports the rear end of the turbine against axial and radial movement, but permits rotation of the engine casing. A shaft 110, driven by the engine, is connected through a flexible coupling 112 to a shaft 114 which extends into the transmission 12. Each of the shafts 114 of the right-hand and left-hand engines are in turn connected to the rotor head 16.

The support bracket 34 has a load-cell mount attached thereto which extends away from the center line of the fuselage. In this mount, a track device 79 is formed as a channel member having guiding sides 70 and bottom 72 with inwardly extending flanges 74 on the top. A portion of the bottom 72 is cut out at 76 to permit a bell-crank lever arm 54 to have free movement. The mount is attached to bracket 34 so that a load cell 80 positioned in the track device 79 can have one end attached to a point on lever arm 54 between the pivotal mounting point of bell crank 50 and the mounting point of horizontal transmitting link 60. This is done by an adjustable link 90 which is pivotally mounted to arm 54 at 92 and attached to one end of the load cell 80. The free end of the mount has a fixed member 82 held therein by bolts 84.

Damping means including a plurality of alternate rubber and metal plates 86 and 88 are positioned between the fixed member 82 and the other end of the load cell 80. The plate member 94 adjacent the one end of the load cell 80 is provided with means for guiding the load cell at that end. All of the alternate rubber and metal plates are adhered together for ease of handling.

The load cell 80 is a commercially available item which detects a force placed between its two ends and puts out a signal which will actuate an indicator 500 calibrated to show percent torque. With two engines, an indicator is used having two pointers, one located at a plane above the other and having coaxial pivot axis. One engine has its load cell connected to actuate one pointer while the other load cell is connected to actuate the other pointer.

With reference to the left-hand engine, the mount structure is the same except that the support links 28a and 30a and transmitting links 46a and 56a are shorter than their counterparts in the right-hand engine to permit a lower location of the left-hand engine. The downwardly extending arms 44a and 54a are shorter than their counterparts in the right-hand engine in view of the fact that the horizontal transmitting link 60a does not extend in the same direction as the track device 79a from the arm 44a.

*Operation*

It can be seen that the weight W of the engine has an equal upward reaction on each of the transmitting links 46 and 56. With this reaction, there will be no movement of the links 46 and 56 due to connecting link 60 and, therefore, no movement of the load cell 80. However, as torque T is placed upon the engine, the bracket 22 is moved in a downward direction as indicated by the arrow, and the bracket 24 is moved in an upward direction as indicated by the arrow. These motions are transmitted through levers 26 and 27 to move link 46 in an upward direction and to move link 56 in a downward direction. This rotates both bell-crank levers 40 and 50 clockwise about their pivots. Movement of bell-crank lever 50 has its movement transmitted to the load indicating device through the link 90. The damping means can be varied as the vibration characteristics of the aircraft or other mounting structure change. Load cell 80, which is capable of electrically measuring the force applied, transmits the signal to the indicator 500 for the right-hand engine and moves the pointer to indicate the torque reading. The action is identical for the left-engine, but the movement is transmitted to the load cell 80a through a link 90a from the bell-crank lever 40a.

It is to be understood that the invention is not limited to the specific description above or to the specific figures, but may be used in other ways without departure from its spirit as defined by the following claims.

I claim:
1. In combination:
   (a) an engine having a casing,
   (b) a body on which said casing is mounted,
   (c) said casing having one mounting which permits rotation of the casing,
   (d) said casing having another mounting,
   (e) said other mounting including:
      (1) a first lever pivotally attached to said casing on one side and extending therefrom,
      (2) a second lever pivotally attached to said casing on the opposite side and extending therefrom,
      (3) each lever lever being pivotally mounted between its ends with respect to said body,
      (4) means connecting the outer free end of each lever to said body,
      (5) said last-named connecting means including a load measuring device for measuring the movement of the free ends of said levers.
2. In combination:
   (a) an engine having a casing,
   (b) a body on which said casing is mounted,
   (c) said casing having one mounting which permits rotation of the casing,
   (d) said casing having another mounting,
   (e) said other mounting including:
      (1) a first lever pivotally attached to said casing on one side and extending therefrom,
      (2) a second lever pivotally attached to said casing on the opposite side and extending therefrom,
      (3) means pivotally mounting each lever intermediate its ends with respect to said body,
      (4) linkage means connecting the outer free end of each lever to each other coordinating the movement of one lever to the other about its intermediate pivotal mounting,

(5) said last-named linkage means resisting the movement of said levers to turn about their pivotal mounting in opposite directions, (6) said last-named linkage means including a load measuring device for measuring the movement of said levers to turn about their pivotal mounting in the same direction.

3. In combination:
(a) an engine having a casing,
(b) a body on which said casing is mounted,
(c) said casing having a rear mounting which permits rotation of the casing,
(d) said casing having a forward mounting,
(e) said forward mounting including:
  (1) a first lever pivotally attached to said casing on one side and extending horizontally radially therefrom,
  (2) a second lever pivotally attached to said casing on the opposite side and extending horizontally radially therefrom,
  (3) means pivotally mounting each lever between its ends with respect to said body,
  (4) means connecting the outer free end of each lever to said body coordinating the movement of said levers in a like direction around each of their pivotal mountings,
  (5) said last-named means restraining said levers against movement in opposite directions around each of their pivotal mountings,
  (6) said last-named means including a load measuring device for measuring the movement of said levers in a like direction around each of their pivotal mountings.

4. In combination:
(a) an engine,
(b) said engine having a casing,
(c) a body on which said casing is mounted,
(d) said casing having one mounting which prevents radial and longitudinal movement but permits rotation of the casing,
(e) said casing having a second mounting located in a lateral plane passing therethrough,
(f) said second mounting including:
  (1) a first lever pivotally attached to said casing and extending radially therefrom on a horizontal line,
  (2) a second lever pivotally attached to said casing at a point diametrically opposed to the attachment of said first lever and extending radially therefrom,
  (3) the center of each lever being pivotally mounted with respect to said body,
  (4) means connecting the outer free end of each lever to said fuselage,
  (5) said last-named connecting means including a load measuring device for measuring the movement of the free ends of said levers.

5. In combination:
(a) an engine,
(b) said engine having a casing,
(c) a body on which said casing is mounted,
(d) said casing having one mounting which prevents radial and longitudinal movement but permits rotation of the casing,
(e) said casing having a second mounting located in a lateral plane passing therethrough,
(f) said second mounting including:
  (1) a first lever pivotally attached to said casing and extending radially therefrom on a horizontal line,
  (2) a second lever pivotally attached to said casing at a point diametrically opposed to the attachment of said first lever and extending radially therefrom,
  (3) means pivotally mounting the center of each lever with respect to said body,
  (4) a first link attached to the outer free end of said first lever,
  (5) a second link attached to the outer free end of said second lever,
  (6) linkage means interconnecting the free ends of said first and second links together to coordinate their movement,
  (7) said linkage means restraining the movement of said first and second links in the same direction,
  (8) said linkage means including a load measuring device measuring the movement of said first and second links in opposite directions.

6. In combination:
(a) an engine,
(b) said engine having a casing,
(c) a body on which said casing is mounted,
(d) said casing having one mounting which prevents radial and longitudinal movement but permits rotation of the casing,
(e) said casing having a second mounting located in a lateral plane passing therethrough,
(f) said second mounting including:
  (1) a first lever pivotally attached to said casing and extending radially therefrom on a horizontal line,
  (2) a second lever pivotally attached to said casing at a point diametrically opposed to the attachment of said first lever and extending radially therefrom,
  (3) means pivotally mounting the center of each lever with respect to said body,
  (4) a first link attached to the outer free end of said first lever,
  (5) a second link attached to the outer free end of said second lever,
  (6) a first bell-crank lever pivoted to said body,
  (7) a second bell-crank lever pivoted to said body,
  (8) said first link being connected to said first bell-crank lever,
  (9) said second link being connected to said second bell-crank lever,
  (10) said first and second bell-crank levers being connected together,
  (11) said second mounting restraining the movement of said first and second links in the same direction,
  (12) a load measuring device measuring the movement of said first and second links in opposite directions.

7. In combination:
(a) an engine,
(b) said engine having a casing,
(c) a body on which said casing is mounted,
(d) said casing having one mounting which prevents radial and longitudinal movement but permits rotation of the casing,
(e) said casing having a second mounting located in a lateral plane passing therethrough,
(f) said second mounting including:
  (1) a first lever pivotally attached to said casing and extending radially therefrom on a horizontal line,
  (2) a second lever pivotally attached to said casing at a point diametrically opposed to the attachment of said first lever and extending radially therefrom,
  (3) means pivotally mounting the center of each lever with respect to said body,
  (4) a first link attached to the outer free end of said first lever and extending therefrom at an angle of approximately 90°,
  (5) a second link attached to the outer free end of said second lever and extending therefrom at an angle of approximately 90°,
   (6) a first bell-crank lever pivoted to said body,
   (7) a second bell-crank lever pivoted to said body,
   (8) said first link being connected to said first bell-crank lever,
   (9) said second link being connected to said second bell-crank lever,
   (10) said first and second bell-crank levers being connected together,
   (11) said second mounting restraining the movement of said first and second links in the same direction,
   (12) a load measuring device measuring the movement of said first and second links in opposite direction.

8. In combination:
 (a) an engine,
 (b) said engine having a casing,
 (c) a body on which said casing is mounted,
 (d) said casing having one mounting which prevents radial and longitudinal movement but permits rotation of the casing,
 (e) said casing having a second mounting located in a lateral plane passing therethrough,
 (f) a torque indicator,
 (g) said second mounting including:
   (1) a first lever pivotally attached to said casing and extending radially therefrom on a horizontal line,
   (2) a second lever pivotally attached to said casing at a point diametrically opposed to the attachment of said first lever and extending radially therefrom,
   (3) means pivotally mounting the center of each lever with respect to said body,
   (4) a first link attached to the outer free end of said first lever,
   (5) a second link attached to the outer free end of said second lever,
   (6) linkage means interconnecting the free ends of said first and second links together to coordinate their movement,
   (7) said linkage means restraining the movement of said first and second links in the same directions,
   (8) said linkage means including a load measuring device measuring the movement of said first and second links in opposite directions.
 (h) said load measuring device being connected to said torque indicator to actuate it.

9. In combination:
 (a) an engine,
 (b) said engine having a casing,
 (c) a body on which said casing is mounted,
 (d) said casing having one mounting which prevents radial and longitudinal movement but permits rotation of the casing,
 (e) said casing having a second mounting located in a lateral plane passing therethrough,
 (f) said second mounting including:
   (1) a first lever pivotally attached to said casing and extending radially therefrom on a horizontal line,
   (2) a second lever pivotally attached to said casing at a point diametrically opposed to the attachment of said first lever and extending radially therefrom,
   (3) means pivotally mounting the center of each lever with respect to said body,
   (4) a first link attached to the outer free end of said first lever,
   (5) a second link attached to the outer free end of said second lever,
   (6) a first bell-crank lever pivoted to said body,
   (7) a second bell-crank lever pivoted to said body,
   (8) said first link being connected to said first bell-crank lever,
   (9) said second link being connected to said second bell-crank lever,
   (10) said first and second bell-crank levers being connected together,
   (11) said second mounting restraining the movement of said first and second links in the same direction,
   (12) a bracket fixed to said body,
   (13) a load measuring device mounted in said bracket,
   (14) said load measuring device measuring the movement of said first and second links in opposite directions.

10. In combination:
 (a) an engine,
 (b) said engine having a casing,
 (c) a body on which said casing is mounted,
 (d) said casing having one mounting which prevents radial and longitudinal movement but permits rotation of the casing,
 (e) said casing having a second mounting located in a lateral plane passing therethrough,
 (f) said second mounting including:
   (1) a first lever pivotally attached to said casing and extending radially therefrom on a horizontal line,
   (2) a second lever pivotally attached to said casing at a point diametrically opposed to the attachment of said first lever and extending radially therefrom,
   (3) a first member pivotally attached to the center of the first lever,
   (4) a second member pivotally attached to the center of the second lever,
   (5) one of said members being fixedly mounted to said body,
   (6) the other of said members being pivotally mounted to said body,
   (7) a first link attached to the outer free end of said first lever,
   (8) a second link attached to the outer free end of said second lever,
   (9) a first bell-crank lever pivoted to said body,
   (10) a second bell-crank lever pivoted to said body,
   (11) said first link being connected to said first bell-crank lever,
   (12) said second link being connected to said second bell-crank lever,
   (13) said first and second bell-crank levers being connected together,
   (14) said second mounting restraining the movement of said first and second links in the same direction,
   (15) a bracket fixed to said body,
   (16) a load measuring device mounted in said bracket,
   (17) said load measuring device measuring the movement of said first and second links in opposite directions.

11. In combination:
 (a) an engine having a casing,
 (b) a body on which said casing is mounted,
 (c) said casing having one mounting which permits rotation of the casing,
 (d) said casing having another mounting,
 (e) a torque indicator,
 (f) said other mounting including:
   (1) a first lever pivotally attached to said casing on one side and extending therefrom,
   (2) a second lever pivotally attached to said casing on the opposite side and extending therefrom,
(3) each lever being pivotally mounted between its ends with respect to said body,
(4) means connecting the outer free end of each lever to said body,
(5) said last-named connecting means including a load measuring device for measuring the movement of the free ends of said levers.
(g) means connecting said load measuring device to said torque indicator to actuate it.

12. In combination:
(a) an engine having a casing,
(b) a body on which said casing is mounted,
(c) said casing having one mounting which permits rotation of the casing,
(d) said casing having another mounting,
(e) a torque indicator,
(f) said other mounting including:
(1) a first lever pivotally attached to said casing on one side and extending therefrom,
(2) a second lever pivotally attached to said casing on the opposite side and extending therefrom,
(3) means pivotally mounting each lever intermediate its ends with respect to said body,
(4) linkage means connecting the outer free end of each lever to each other coordinating the movement of one lever to the other about its intermediate pivotal mounting,
(5) said last-named linkage means resisting the movement of said levers to turn about their pivotal mounting in opposite directions,
(6) said last-named linkage means including a load measuring device for measuring the movement of said levers to turn about their pivotal mounting in the same direction.
(g) means connecting said load measuring device to said torque indicator to actuate it.

13. In combination:
(a) an engine,
(b) said engine having a casing,
(c) a body on which said casing is mounted,
(d) said casing having one mounting which prevents radial and longitudinal movement but permits rotation of the casing,
(e) said casing having a second mounting located in a lateral plane passing therethrough,
(f) said second mounting including:
(1) a first lever pivotally attached to said casing and extending radially therefrom on a horizontal line,
(2) a second lever pivotally attached to said casing at a point diametrically opposed to the attachment of said first lever and extending radially therefrom,
(3) means pivotally mounting the center A of each lever with respect to said body,
(4) a first link attached to the outer free end of said first lever and extending downwardly therefrom at an angle of approximately 90°,
(5) a second link attached to the outer free end of said second lever and extending downwardly therefrom at an angle of approximately 90°,
(6) a first bell-crank lever pivoted to said body below the center A of the first lever,
(7) a second bell-crank lever pivoted to said body below the center A of the second lever,
(8) said first bell-crank lever having a vertical and a horizontal arm,
(9) said second bell-crank lever having a vertical and a horizontal arm,
(10) said first link being connected to the horizontal arm at said first bell-crank lever,
(11) said second link being connected to the horizontal arm at said second bell-crank lever,
(12) said first and second bell-crank levers being connected together between their vertical arms,
(13) said second mounting restraining the movement of said first and second links in the same direction,
(14) a load measuring device,
(15) means mounting said load measuring device on said body,
(16) said load measuring device measuring the movement of said first and second links in opposite directions.

14. In combination:
(a) an engine,
(b) said engine having a casing,
(c) a body on which said casing is mounted,
(d) said casing having one mounting which prevents radial and longitudinal movement but permits rotation of the casing,
(e) said casing having a second mounting located in a lateral plane passing therethrough,
(f) said second mounting including:
(1) a first lever pivotally attached to said casing and extending radially therefrom on a horizontal line,
(2) a second lever pivotally attached to said casing at a point diametrically opposed to the attachment of said first lever and extending radially therefrom,
(3) a first member pivotally attached to the center of the first lever,
(4) a second member pivotally attached to the center of the second lever,
(5) one of said members being fixedly mounted to said body,
(6) the other of said members being pivotally mounted to said body,
(7) a first link attached to the outer free end of said first lever and extending downwardly therefrom at an angle of approximately 90°,
(8) a second link attached to the outer free end of said second lever and extending downwardly therefrom at an angle of approximately 90°,
(9) a first bell-crank lever pivoted to said body below the center of the first lever,
(10) a second bell-crank lever pivoted to said body below the center of the second lever,
(11) said first bell-crank lever having a vertical and a horizontal arm,
(12) said second bell-crank lever having a vertical and a horizontal arm,
(13) said first link being connected to the horizontal arm of said first bell-crank lever,
(14) said second link being connected to the horizontal arm of said second bell-crank lever,
(15) said first and second bell-crank levers being connected together between their vertical arms,
(16) said second mounting restraining the movement of said first and second links in the same direction,
(17) a load measuring device,
(18) means mounting said load measuring device on said body,
(19) said load measuring device measuring the movement of said first and second links in opposite directions.

References Cited in the file of this patent

UNITED STATES PATENTS

| | | |
|---|---|---|
| 1,624,761 | Royce | Apr. 12, 1927 |
| 1,803,895 | Curtiss | May 5, 1931 |
| 2,615,657 | Young | Oct. 28, 1952 |
| 2,828,939 | Grey | Apr. 1, 1958 |
| 3,057,582 | Kerry | Oct. 9, 1962 |